United States Patent [19]

Lanzer

[11] Patent Number: 4,747,643
[45] Date of Patent: May 31, 1988

[54] MOTOR VEHICLE HAVING TWO DRIVEN AXLES AND BRAKE SYSTEM

[75] Inventor: Heribert Lanzer, Gössendorf, Austria

[73] Assignee: Steyr-Daimler-Puch Aktiengesellschaft, Vienna, Austria

[21] Appl. No.: 42,355

[22] Filed: Apr. 24, 1987

[30] Foreign Application Priority Data

Apr. 29, 1986 [AT] Austria ............................. A1140/86

[51] Int. Cl.⁴ ........................ B60K 17/34; B60T 8/32
[52] U.S. Cl. ........................................ 303/2; 180/233;
180/248; 180/249; 188/181 T; 188/349;
303/9.62; 303/9.71; 303/100; 303/112; 303/113
[58] Field of Search ............... 180/233, 248, 249, 197;
303/100, 20, 112, 111, 113, 110, 6; 188/181 T,
349, 181 A

[56] References Cited

U.S. PATENT DOCUMENTS

| | | | |
|---|---|---|---|
| 4,538,700 | 9/1985 | Suzuki | 180/248 |
| 4,552,241 | 11/1985 | Suzuki | 180/249 |
| 4,589,511 | 5/1986 | Leiber | 180/197 |
| 4,605,087 | 8/1986 | Ashauer et al. | 180/248 |
| 4,641,895 | 2/1987 | Belart et al. | 303/110 X |
| 4,669,569 | 6/1987 | Suzuki et al. | 180/249 |
| 4,671,373 | 6/1987 | Sigl | 180/197 |

FOREIGN PATENT DOCUMENTS

| | | |
|---|---|---|
| 3317247 | 11/1984 | Fed. Rep. of Germany . |
| 3428865 | 9/1985 | Fed. Rep. of Germany . |
| 3418520 | 11/1985 | Fed. Rep. of Germany . |
| 3432841 | 3/1986 | Fed. Rep. of Germany . |
| 2057987 | 7/1979 | United Kingdom . |

Primary Examiner—Douglas C. Butler
Attorney, Agent, or Firm—Marmorek, Guttman & Rubenstein

[57] ABSTRACT

A motor vehicle comprises two driven axles (5, 8), which are interconnected by an interaxle coupling (10) for transmitting a torque only when the halves of the coupling (10) rotate at different speeds and by a speed-changing transmission (9) connected in series with the coupling (10). A brake system (12 to 15) is provided for braking the wheels of both axles (5, 8). In order to ensure that the wheels of the driven rear axle (8) will not block before the wheels of the driven front axle (5), a pressure-setting controller (17) is adapted to control a brake pressure regulator (16) associated with the driven rear axle (8) and is responsive to a reversal of the direction in which torque is transmitted to and from the driven rear axle (8). During a transmission of torque from the driven rear axle (8) to the driven front axle (5), the pressure-setting controller (17) substantially reduces in dependence on the value of the torque being transmitted the pressure which is applied to brake the wheels of the driven rear axle (8) relative to the pressure which is applied to brake the wheels of the driven front axle (5).

7 Claims, 3 Drawing Sheets

MOTOR VEHICLE HAVING TWO DRIVEN AXLES AND BRAKE SYSTEM

BACKGROUND OF THE INVENTION

1. Field of the Invention

This invention relates to a motor vehicle comprising two driven axles, and an interaxle power train, which operatively connects the two driven axles and comprises an interaxle coupling for transmitting torque only when the two coupling members of the coupling rotate at different speeds, and a speed-changing transmission in series with the coupling, and also comprising a brake system for braking all wheels of the driven axles.

2. Description of the Prior Art

In a motor vehicle, particularly in a passenger car, the brake system is usually so designed that the adhesion is utilized to a higher degree at the front axle than at the rear axle so that the wheels of the rear axle will not be blocked before the wheels of the front axle as a blocking of the wheels of the rear axle would eliminate the directional control of the vehicle. That utilization of the adhesion at the wheels of both axles to different degrees involves different wheel slips of the two axles. In a motor vehicle which has two driven axles, which are operatively connected by a hydraulic friction coupling or any interaxle coupling which transmits torque only when the coupling members of the coupling rotate at different speeds, the different wheel slips of the two axles will result in a differential speed so that torque will be transmitted by the interaxle coupling. Because a braking will cause the wheels of the driven front axle to rotate with a larger slip, i.e., at a lower speed, than those of the driven rear axle, the torque will be transmitted by the interaxle coupling from the driven rear axle to the driven front axle. Owing to that transmission of torque, the adhesion at the wheels of the driven rear axle will be utilized to a higher degree and the adhesion at the front wheels will be utilized to a lower degree so that said degrees of utilization will approach each other. For a given adhesion, a careful control of the brake pressure will permit a higher retardation of a vehicle having two driven axles than of a vehicle having only one driven axle because in the former the wheels of the rear axle will be braked more strongly and the transmission of torque from the rear axle to the front axle will delay the blocking of the wheels of the front axle. In case of a blocking of the wheels of the driven front axle, the high differential speed will cause the hydraulic friction coupling or other interaxle coupling between the two driven axle to transmit a higher torque so that the adhesion at the wheels of the rear axle will immediately be overcome, at least one of the wheels of the rear axle will be blocked and the directional control will be lost. That riding and braking behavior of the vehicle will not be altered when the interaxle power train comprises also a speed-changing transmission, e.g., a planetary gear train, in series with interaxle coupling.

From U.S. Pat. No. 4,605,087 it is already known to provide a drive system which has a hydraulic friction coupling connected between the two driven axles and in which in case of a blocking of the front wheels a blocking of the wheels of the rear axle will be prevented by a clutch or an overrunning coupling, which is connected between the two axles, so that a reduction of the speed of the front wheels resulting from an application of the service brake will not be transmitted by the power train to the rear wheels. In that arrangement the advantages afforded by the transmission of torque between the two driven axles in case of a careful application of the brake are eliminated.

SUMMARY OF THE INVENTION

It is an object of the invention to eliminate said disadvantages and to provide a motor vehicle which is of the kind described first hereinbefore and in which the advantages afforded by the transmission of torque between the two driven axles during a normal braking are preserved and the tendency of the wheels of the rear axle to block during a blocking of the front wheels is reduced.

This object is accomplished in accordance with the invention in that the brake pressure regulator, which is associated in known manner with the rear axle is arranged to be xontrolled by a pressure-setting controller, which is responsive to a reversal of the direction in which torque is transmitted to and from the rear driven axle and in case of a transmission of torque from the rear driven axle and in dependence on the torque being transmitted will cause the pressure applied to brake the wheels of the rear axle to be substantially reduced relative to the pressure applied to brake the wheels of the driven front axle.

In that arrangement a reversal of the direction in which torque is transmitted to and from the driven rear axle is utilized to adjust the brake pressure regulator in such a manner that the pressure applied to brake the wheels of the rear axle is lower than the pressure applied to brake the wheels of the front axle as soon as torque is being transmitted from the rear axle to the front axle and the torque transmitted by the interaxle coupling has risen to a predetermined value. The reduction of the pressure applied to brake the wheels of the rear axle will eliminate the risk of the blocking of said rear wheels in such a manner that the advantages afforded by the transmission of torque between the two driven axles will be preserved during normal operation because the pressure applied to brake the wheels of the rear axle will not be reduced until the torque transmitted by the interaxle coupling has risen to a predetermined value.

If the speed-changing transmission connected in series with the interaxle coupling consists of a planetary gear train hving a torque-transmitting element for transmitting a reaction torque, that torque-transmitting element or that coupling member of a liquid friction coupling to which said reaction torque is directly transmitted may be so arranged that during a transmission of torque to the driven rear axle said torque transmitting element or said coupling member of the interaxle coupling will be supported against a stop which is rigid with the chassis of the vehicle and in case of a reversal of the direction of torque transmission said torque-transmitting element or said coupling member of the interaxle coupling is disengaged from said stop against the force of a spring so that said torque-transmitting element or said coupling constitutes at least part of the pressure-setting controller for controlling the brake pressure regulator. In that arrangement, the advantage afforded by the direct measurement of the magnitude and direction of the torque being transmitted is utilized. Simple structural means may be utilized in that case because they are required to take up only the reaction torque. The operative connection to the brake pressure regulator may be established by mechanical or electrically operated means and is preferably established by a fluid-handling system.

When the vehicle is strongly retarded from a high speed, torque will be transmitted from the driven rear axle to the driven front axle and this will result in a reduction of the pressure applied to brake the wheels of the rear axle. But such a strong retardation can occur in any case only when the adhesion is relatively high so that in that case a control resulting in a reduction of the pressure applied to brake the wheels of the driven rear axle is not desirable. For this reason it is within the scope of the invention to provide an auxiliary device for interrupting the operative connection between the pressure-setting controller and the brake pressure regulator in response to a rise of the retardation of the vehicle above a predetermined value.

A blocking of the wheels of the rear axle and the resulting loss of directional control usually result in a yaw of the vehicle, i.e., in an undesired lateral angular movement about the vertical axis of the vehicle, and/or in a swerving of the vehicle. Within the scope of the invention it will be sufficient to prevent a blocking of the wheels of the rear axle by a reduction of the pressure applied to brake said wheels when there is actually a risk of an uncontrolled yawing movement. For this reason it is within the scope of the invention to provide an operative connection between the pressure-setting controller and the brake pressure regulator only when the lateral angular acceleration of the vehicle has risen above a predetermined value.

Conventional brake pressure regulators associated with the wheels for braking the wheels of the driven rear axle are usually so designed that they will freely transmit the inlet pressure only until said pressure has risen to a critical value, which is predetermined or can be selected. When the inlet pressure has risen above said critical value, only a certain percentage of the rising input pressure is transmitted to the brakes for the wheels of the rear axle. In such a system, there will always by a pressure at the outlet of the brake pressure regulator when a pressure is applied to its inlet. In order to permit the pressure in the lines leading to the brakes for the wheels of the driven rear axle to be reduced substantially to the atmospheric pressure, the brake pressure regulator is provided with means for reducing to the pressure in the line leading to the brakes for the wheels of the rear axle substantially to the atmospheric pressure independently of the inlet pressure applied to the brake pressure regulator.

DETAILED DESCRIPTION OF THE PREFERRED EMBODIMENTS

Figure 1:
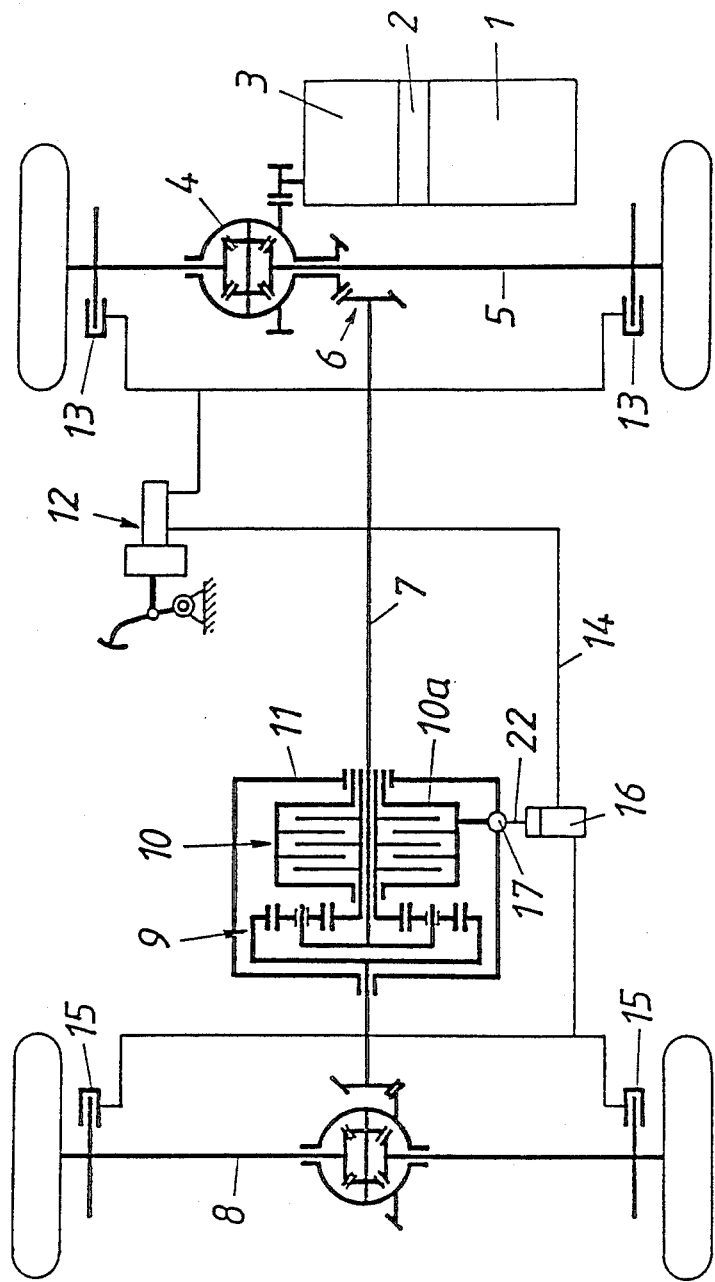
FIG. 1 is a diagrammatic representation of the drive system of a motor vehicle.

The invention is illustrated by way of example on the drawing.

From a motor 1 of a vehicle, torque is transmitted via a driver-controlled clutch 2 and a change-speed gearbox 3 to the housing of a differential 4 for the front axle 5 and via a bevel gear train 6 to an interaxle power train 7 for driving the rear axle 8. In the embodiment shown in FIG. 1 the interaxle power train 7 includes a planetary gear train 9, which has a planetary gear train 9, which has a planet carrier that is directly driven by the bevel gear train 6 and an internal gear for driving the rear axle 8. The sun gear of that planetary gear train 9 is non-rotatably connected to one coupling member, specifically to the inner coupling member, of a liquid friction coupling 10. The other coupling member or housing 10a of that liquid friction coupling 10 is rotatably mounted in a gear housing 11, which is fixed to the chassis of the vehicle. From a main brake cylinder 12, pressure is applied directly to brakes 13 for the front wheels. A line 14 leading from the main brake cylinder 12 to the brakes 15 for the wheels of the rear axle 8 incorporates a brake pressure regulator 16, which is controlled by a pressuresetting controller 17.

Figure 3:
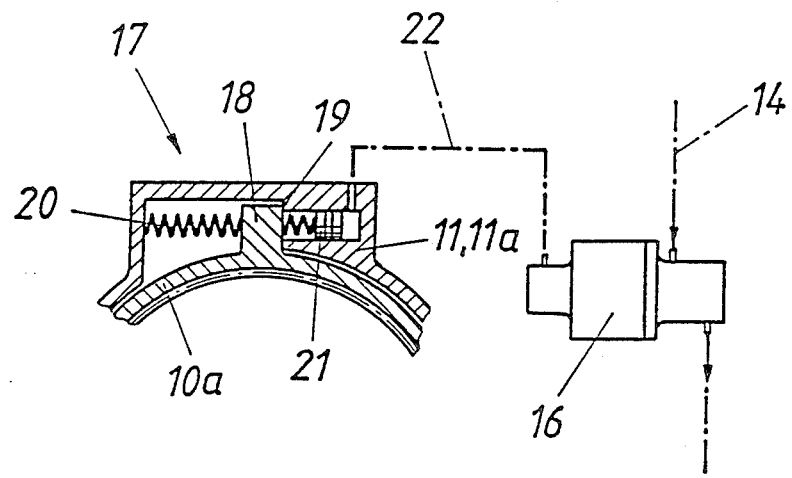
FIG. 3 is a simplified view showing partly in section a detail.

The pressure-setting controller 17 comprises a lug 18 (FIG. 3), which is rigid with the housing 10a of the liquid friction coupling 10 and during a transmission of torque in the normal direction from the driven front axle 5 to the driven rear axle 8, i.e., when a torque in a clockwise sense in FIG. 3 is exerted on the housing 10a, said lug 18 bears on a fixed stop 19 that is rigid with the housing 11. A spring 20 is provided, which urges the lug 18 against the stop 19. In response to a reversal of the direction in which torque is transmitted and to a rise of the reaction torque to a value at which the force of the spring 20 is overcome, the lug 18 will disengage the stop 19. A piston 21 is subjected to hydraulic pressure from line 22 and in response to said disengagement of the lug 18 from the stop 19 is displaced to the left in FIG. 3 so that a pressure drop is effected in the line 22, which leads to the brake pressure regulator 16.

Figure 4:
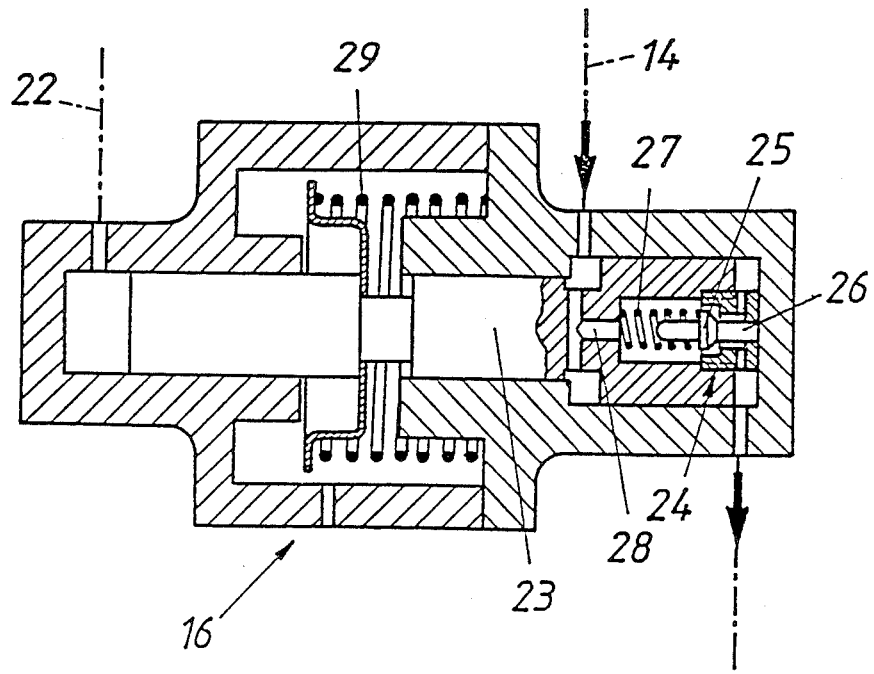
FIG. 4 is an axial sectional view showing a brake pressure regulator on a larger scale.

The brake pressure regulator 16 shown in FIG. 4 comprises a housing and a piston 23, which is displaceable in said housing and at one end is provided with a valve 24. The valve 24 comprises a valve disc 25, which is biased by a spring 27 and carries a stem 26, which extends through the adjacent end wall of the piston 23. At the beginning of a braking operation the piston 23 assumes the position shown in FIG. 4 so that pressure is freely applied from the main brake cylinder 12 through the line 14, the passages 28 in the piston 23 and the valve 24 to the brakes 15 for the wheels of the rear axle 8. The areas of the piston faces at opposite ends of the piston 23 and the force of a spring 29 which biases the piston 23 are so matched that a pressure rise in the line 14 to a predetermined value will cause the piston 23 to be displaced to the left in FIG. 4 so that the spring 27 can now move the valve disc 25 against the associated valve seat and the flow through the piston 23 is thus interrupted. From that time, only a certain percentage of the pressure applied by the main brake cylinder 12 is transmitted to the brakes 15 for the wheels of the rear axle 8. That percentage will depend on the equal and opposite forces acting on the piston 23.

When torque is being transmitted from the rear axle 8 to the front axle 5 and said torque has risen to a predetermined value, the piston 21 of the pressure-setting controller 17 will effect a pressure reduction in the line 22 and also at the left-hand end of the piston 23 in FIG. 4. As a result, the pressure in the line leading from the brake pressure regulator 16 to the brake 15 for the wheels of the rear axle 8 will also be reduced. If the piston 23 is integral and the spring 29 is properly dimensioned, the pressure in line 22 may be reduced to such an extent that the piston 23 is displaced to the left in FIG.

4 to such an extent that the pressure in the line leading to the brakes 15 for the wheels of the driven rear axle 8 is reduced substantially to the atmospheric pressure.

Figure 2:
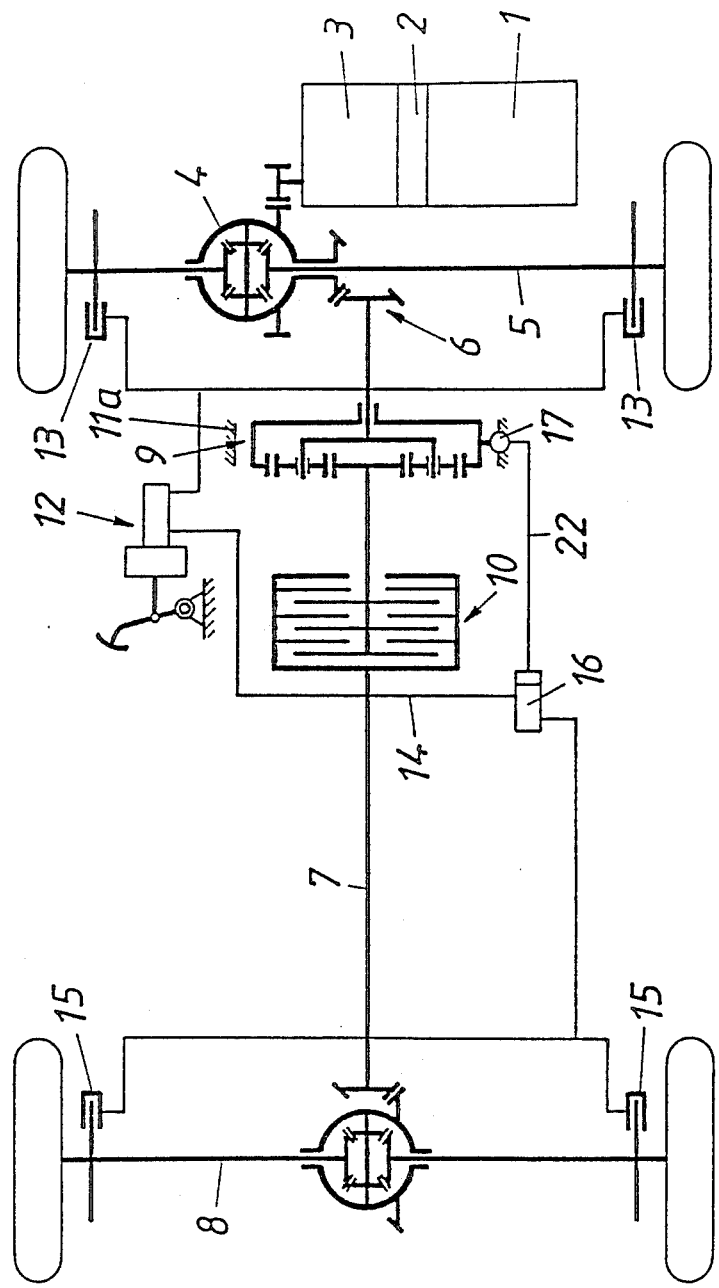
FIG. 2 is a diagrammatic representation of a modified drive system.

In the embodiment shown in FIG. 2 the internal gear of the planetary gear train 9 is supported by the pressure-setting controller 17 on a member 11a, which is rigid with the chassis, and the liquid friction coupling 10 serves as an interaxle differential between the driven front axle 5 and the driven rear axle 8 so that said coupling is not supported against rotation.

It may be desirable to interpose in the connection between the pressure-setting controller 17 and the brake pressure regulator 16 a sensor which utilizes, e.g., an inert mass for interrupting said connection when the retardation of the vehicle has risen above a predetermined value or when the lateral angular acceleration of the vehicle is below a predetermined value.

What is claimed is:

1. In a motor vehicle comprising
    a driven front axle having front wheels,
    a driven rear axle having rear wheels,
    an interaxle power train interconnecting said front and rear axles and comprising a speed-changing transmission and in series with said transmission a liquid friction coupling having two coupling members and adapted to transmit torque only when said two coupling members rotate at different speeds, and
    a brake system for applying pressure to brake said front and rear wheels, which brake system comprises a brake pressure regulator for controlling the pressure applied to brake said rear wheels,
    the improvement residing in that
    a pressure-setting controller is provided, which is responsive to a reversal of the direction of torque transmission between said interaxle coupling and said rear axle and to the value of torque transmitted from the rear axle to said interaxle coupling and is adapted to operate said brake pressure regulator in dependence on said value of torque said brake pressure regulator so as to effect a substantial reduction of the pressure applied to brake said rear wheels relative to the pressure applied to brake said front wheels only during a transmission of torque from said rear wheels to said interaxle coupling.

2. The improvement set forth in claim 1, wherein said pressure-setting controller is adapted to effect said reduction of pressure only when said torque transmitted from said rear axle to said interaxle coupling has risen to a predetermined value.

3. The improvement set forth in claim 1, wherein said pressure-setting controller is adapted to effect said reduction of pressure to an extent which depends on said value of torque.

4. The improvement set forth in claim 1, as applied to a motor vehicle which comprises a chassis and in which said speed-changing transmission comprises a planetary gear train having a torque-transmitting member for directly transmitting a reaction torque to one of said coupling members, wherein
    one of the elements consisting of said torque-transmitting member and said one coupling member constitutes a part of said pressure-setting controller,
    said pressure-setting controller compriss a stop, which is rigid with said chassis,
    said one element is arranged to bear on said stop during a transmission of torwue from said interaxle coupling to said rear axle and is adapted to be disengaged from said stop during a transmission of torque from said rear axle to said interaxial coupling,
    spring means are provided, which urge said one element toward said stop, and
    said pressure-setting controller comprises means for operating said brake pressure regulator in response to the disengagement of said one element from said stop so as to effect a substantial reduction of the pressure applied to brake said rear wheels relative to the pressure applied to brake said front wheels.

5. The improvement set forth in claim 1, wherein
    means are provided for establishing an operative connection between said pressure-setting controller and said brake pressure regulator and
    a retardation sensor is provided for sensing the retardation of said vehicle and for interrupting said operative connection when said retardation sensor senses a retardation above a predetermined value.

6. The improvement set forth in claim 1, wherein
    means are provided for establishing an operative connection between said pressure-setting controller and said brake pressure regulator and
    a yaw sensor is provided for sensing the lateral angular acceleration of said vehicle and for interrupting said operative connection when said yaw sensor senses a lateral angular acceleration below a predetermined value.

7. The improvement set forth in claim 1 as applied to a vehicle in which said brake pressure regulator has an inlet and an outlet, wherein
    said brake pressure regulator comprises means for reducing under the control of said pressuresetting controller the pressure at said outlet substantially to the atmospheric pressure regardless of the pressure at said inlet.

* * * * *